United States Patent [19]

Giese

[11] 4,145,637
[45] Mar. 20, 1979

[54] CAPACITOR CHARGE INDICATOR IN AN ELECTRONIC PHOTOFLASH

[75] Inventor: Hans G. Giese, Brunswick, Fed. Rep. of Germany

[73] Assignee: Rollei-Werke Franke & Heidecke, Brunswick, Fed. Rep. of Germany

[21] Appl. No.: 804,314

[22] Filed: Jun. 7, 1977

[30] Foreign Application Priority Data

Jun. 15, 1976 [DE] Fed. Rep. of Germany ....... 2626673

[51] Int. Cl.² ........................................... H05B 41/32
[52] U.S. Cl. ................................ 315/241 P; 315/135; 340/660; 354/127
[58] Field of Search ................... 315/241 P, 129, 135, 315/136; 340/221, 248 A, 248 D; 320/1, 48; 354/127, 145

[56] References Cited

U.S. PATENT DOCUMENTS

| 2,516,209 | 7/1950 | Henninger | 315/129 X |
| 2,927,247 | 3/1960 | Hennis | 315/135 |
| 2,972,705 | 2/1961 | Howells | 315/135 |

*Primary Examiner*—Eugene R. LaRoche
*Attorney, Agent, or Firm*—Stonebraker, Shepard & Stephens

[57] ABSTRACT

A glow lamp for indicating charged readiness of a flash apparatus is provided with a predetermined burning voltage corresponding to a specific charge voltage of the storage capacitor for the flash circuit, and the ignition voltage for the glow lamp is applied as periodic ignition pulses derived from voltage pulses occurring on periodic switching of the converter. The result is a more accurate response of the glow lamp to the desired charge value of the storage capacitor than is obtained by using the ignition voltage of the glow lamp as a threshold value.

4 Claims, 3 Drawing Figures

CAPACITOR CHARGE INDICATOR IN AN ELECTRONIC PHOTOFLASH

BACKGROUND OF THE INVENTION

The invention relates to an electronic flash apparatus having a storage capacitor that is charged through a direct-current converter, and a glow lamp that lights up and indicates the flashing readiness of the apparatus upon reaching a predetermined threshold voltage that corresponds to a specific state of charge of the storage capacitor. In known electronic flash apparatus of this kind, the ignition voltage of the glow lamp is selected for providing the threshold voltage so that when the charge voltage of the storage capacitor allocated to the ignition threshold voltage is reached, the glow lamp ignites and indicates that the apparatus is ready for a flash.

The invention involves recogntion of substantial inaccuracies inherent in such an arrangement. The ignition voltage of ordinary commercial glow lamps fluctuates as a result of manufacturing tolerances in a wide range that usually amounts to + 20 V, for example, for an ignition voltage of 150 V. Also, the same glow lamp does not always ignite at the same voltage after repeated ignitions, and the ignition voltage for any particular glow lamp can be expected to vary by about 10 V average during successive ignitions of the lamp. Because of this wide range of variations in the ignition voltages of glow lamps fluctuating relative to the indicated ignition voltage value, every flash apparatus requires a balancing resistor allowing individual adjustment of the ignition voltage of the respective glow lamp to the required charge condition of the storage capacitor of the flash apparatus. Even after individually setting or adjusting a flash apparatus to the particular ignition voltage of a glow lamp, the lighting up of the glow lamp is not exactly or accurately fixed relative to the charge voltage of the storage capacitor, because of the unavoidable tolerance range in the glow lamp ignition voltage values that vary for repeated ignitions.

The invention recognizes the accuracy problems involved in glow lamp indicators for an electronic flash apparatus of this kind, and aims at improving the accuracy of the glow lamp as an indicator of the desired charge on the storage capacitor for indicating flashing readiness of the circuitry so that lighting up of the glow lamp is a more reliable indication that the predetermined charge voltage of the storage capacitor has been reached within relatively narrow tolerances. The invention also seeks economy, simplicity, reliability, and elimination of adjustment and tuning of the glow lamp indicator device of each flash apparatus.

SUMMARY OF THE INVENTION

The invention applies to an electronic flash apparatus having a storage capacitor chargeable through a direct-current converter and having a glow lamp arranged to light at a predetermined threshold voltage corresponding to a specific charge voltage of the storage capacitor. The glow lamp is arranged so that the predetermined threshold voltage equals the burning voltage of the glow lamp, and means are arranged for applying periodic ignition pulses to the glow lamp, the pulses being derived from voltage pulses occurring during periodic switching of the converter. The converter is preferably a transformer having a secondary winding connected through a rectifier with the storage capacitor, with a resistance voltage divider connected in parallel with the storage capacitor, and the glow lamp connected with the divider tap of the resistance voltage divider. With such an arrangement, a capacitive voltage divider is arranged for detecting voltage variations occurring on the secondary winding of the transformer on periodic switching of the converter, and the divider tap of the capacitive voltage divider is connected with the glow lamp and the divider tap of the resistance voltage divider. The invention is applicable to converters arranged to operate as blocking converters or through-flow converters, and to rectifiers arranged as single or two-way rectifiers.

DETAILED DESCRIPTION

Figure 1:
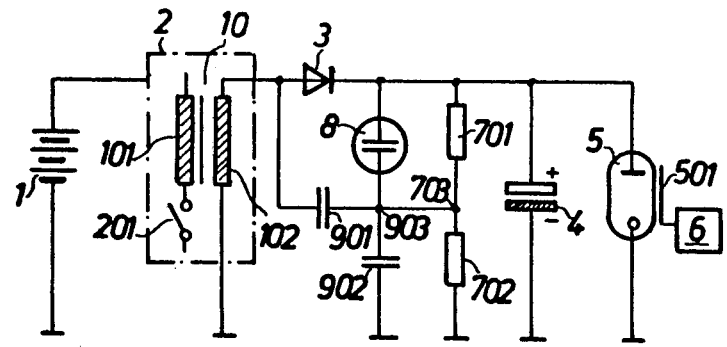
FIG. 1 is a schematic circuit diagram of a preferred embodiment of the inventive flash apparatus cooperating with a through-flow converter.

In the present invention, the threshold voltage corresponding to the predetermined charge value of the storage capacitor is selected as approximately equal to the burning voltage of the glow lamp, rather than equal to the ignition voltage of the glow lamp. Then periodic ignition pulses are applied to the glow lamp, and these are derived from voltage pulses that occur in the periodic switching of the direct-current converter. In this way, the glow lamp is provided with in ignition pulse at every switching of the converter, but the glow lamp can only burn and thus emit a continuous luminous signal when the threshold voltage dependent upon the charge voltage of the storage capacitor has reached the burning voltage of the glow lamp. Since the burning voltage of glow lamps has only a small manufacturing tolerance range, including individual scatter, of slightly more than ± 1% (for example, glow lamps with a voltage of 65 V have a tolerance deviation of ± 1 V), the indicator device according to the invention is dimensioned only once for all the flash apparatuses of an entire manufacturing series, and no adjustment of individual flash circuits is required.

Preferred ways of accomplishing this are shown in the drawings and described below, and the invention is applied to through-flow converters, blocking converters, and both single and two-way rectifiers.

As shown in FIG. 1, the invention is applied to a direct-current converter 2 operating as a through-flow converter supplied by a battery or accumulator 1. The direct-current converter 2 includes a transformer 10 having a primary winding 101 and a secondary winding 102. A storage capacitor 4 for the flash apparatus is arranged in parallel with a flash tube 5 that is connected to the secondary winding 102 through a diode 3. The flash tube 5 is ignited by an ignition device 6 having an ignition electrode 501 in a known way. In parallel with the storage capacitor 4 is a resistance voltage divider consisting of resistors 701 and 702. A glow lamp 8 is connected in parallel with the resistor 702 so that one terminal of glow lamp 8 is connected with the divider tap 703 between voltage divider resistors 701 and 702, and the other terminal of glow lamp 8 is connected with a potential point that is higher than the potential at the divider tap 703, except when the storage capacitor 4 is fully discharged.

A capacitive voltage divider consisting of capacitors 901 and 902 is also connected in parallel with the secondary winding 102 of the transformer 10. The divider tap 903 of the capacitive voltage divider is connected with the terminal of glow lamp 8 that is also connected to the divider tap 703 of the resistance voltage divider.

In the operation of the circuit of FIG. 1, the through-flow converter 2 works in a known way as a one-stroke converter in response to the opening and closing of a transistor switch 201 (shown schematically in FIG. 1) arranged in the circuit of the primary winding 101 of the transformer 10. At every periodic closure of the switch 201, the voltage induced in the secondary winding 102 of the transformer 10 causes a current flux through the diode 3 and the storage capacitor 4 for charging up the storage capacitor 4. At every opening of the switch 201 a relatively large voltage is induced briefly in the secondary winding 102 in a direction opposite to the voltage in the secondary winding during the closure phase of the switch 201. This greatly reduces the potential at the input of the diode 3, and the potential variation is transmitted through capacitor 901 to the capacitive voltage divider tap 903 so that upon opening of the switch 201 a high voltage sufficient to ignite the glow lamp 8 is applied to the glow lamp 8 by the large reduction of the potential at its connection point to the capacitive divider tap 903.

The resistance voltage divider is designed so that at the desired charge voltage of the storage capacitor 4, a potential difference is developed across resistor 701 that equals the burning voltage of the glow lamp 8, within the range of permissible tolerance. While the charge voltage of the storage capacitor 4 has not reached full value, the voltage across the resistor 701 remains less than the burning voltage of the glow lamp 8 so that even though ignition pulses are applied to the glow lamp 8 upon opening of the switch 201 as described above, the glow lamp 8 cannot burn because of lack of an adequate burning voltage. The internal resistance of the capacitive voltage divider is also properly dimensioned to achieve this result. Only when the voltage on the storage capacitor 4 has reached the full intended charge value is the voltage across the resistor 701 sufficient to apply the burning voltage to the glow lamp 8 and allow an ignition pulse occurring upon opening of the switch 201 to ignite the glow lamp 8 and keep the glow lamp 8 burning with a sufficient burning voltage delivered by the storage capacitor 4 to the resistor 701. Then the continuously visible lighting up of the glow lamp 8 signals that the desired charge value of the storage capacitor has been reached and that the apparatus is ready for a flash. Using the burning voltage as a threshold value for the steady illumination of the glow lamp 8 is much more accurate than using a more variable ignition voltage and also eliminates any need for adjusting each circuit to accommodate each particular glow lamp.

Figure 2:
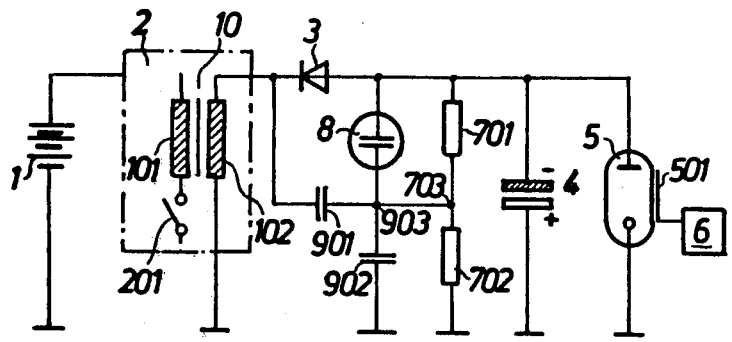
FIG. 2 is a schematic circuit diagram of another embodiment of the inventive flash apparatus cooperating with a blocking converter.

In the embodiment of FIG. 2, the converter 2 is arranged to operate as a blocking converter, and the circuitry differs from the circuitry of FIG. 1 only in the reversal of the forward direction of the diode 3 and the charging of the storage capacitor 4 in the opposite polarity. If an electrolytic capacitor is used, the capacitor connections must be reversed. Otherwise, the circuit of FIG. 2 corresponds with the circuit of FIG. 1.

The embodiment of FIG. 2 operates in a closely similar way to the embodiment of FIG. 1, with the difference that the storage capacitor 4 is charged during the blocking phase of the direct-current converter 2 when the switch 201 is opened, and the closure of switch 201 causes a voltage variation in the secondary winding 102 of the transformer 10. This voltage variation passes through the capacitor 901 of the capacitive voltage divider and appears at the capacitive voltage divider tap 903 to produce an ignition pulse for the glow lamp 8. The resistor 701 applies the burning voltage to the glow lamp 8 when storage capacitor 4 reaches a full desired charge, and the glow lamp 8 thereupon ignites on an ignition pulse and glows steadily to indicate flash readiness.

Figure 3:
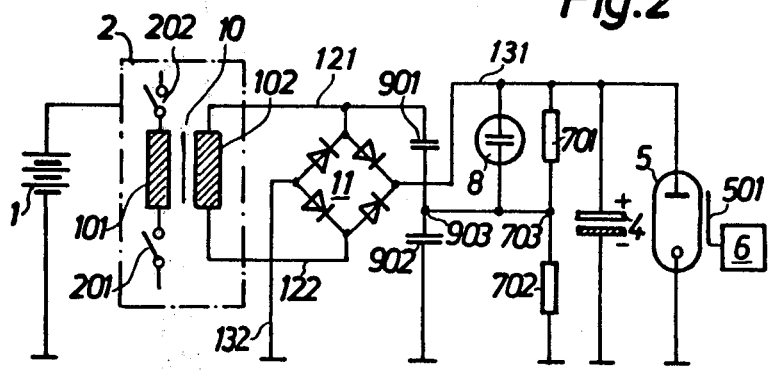
FIG. 3 is a schematic circuit diagram of a third embodiment of the inventive flash apparatus cooperating with a two-way rectifier bridge.

In the embodiment of FIG. 3, the converter 2 cooperates with a two-way bridge rectifier 11. The converter 2 of FIG. 3 can be arranged as a totalling converter similar to the one-stroke converters of FIGS. 1 and 2 by having switch 201 open and close periodically. The converter 2 can also be operated as a push-pull converter having two switches 201 and 202 arranged in the circuit of the primary winding 101 of the transformer 10 to open and close alternately. An example of such a push-pull converter is disclosed in British Pat. No. 1,354,134, published May 22, 1974. Such a push-pull converter cooperates with the two-way bridge recitifer 11 so that both working phases of the converter are exploited for charging the storage capacitor 4.

The secondary winding 102 of the transformer 10 of the embodiment of FIG. 3 is connected by means of two rectifier input leads 121 and 122 to the two inputs of the two-way bridge rectifier 11. The two outputs of the rectifier bridge 11 are connected through output leads 131 and 132 with the storage capacitor 4. The resistance voltage divider consisting of the resistors 701 and 702 is connected in parallel with the storage capacitor 4, and the glow lamp 8 is arranged in parallel with the resistor 701. However, the same effect can be achieved by connecting the glow lamp 8 in parallel with the resistor 702. The capacitive voltage divider consisting of the capacitors 901 and 902 is connected between the input lead 121 and the output lead 132 of the bridge rectifier 11. The connection points of the capacitive voltage divider relative to the bridge rectifier can be interchanged as desired, because it is optional as to which of the input leads and to which of the output leads of rectifier 11 the capacitive voltage divider is connected. For example, the capacitive voltage divider formed by capacitors 901 and 902 can be connected to input lead 121 and output lead 131 or to input lead 122 and output lead 132.

The embodiment of FIG. 3 operates in a similar way to the embodiments of FIGS. 1 and 2. With each opening and closing of the switches 201 and 202, voltage variations are caused in the secondary winding 102, and these are differentiated through the capacitive voltage divider to the capacitive divider 903 applying an ignition pulse to the glow lamp 8. An ignition pulse always occurs at a terminal of the glow lamp 8 when the potential in input lead 121 decreases suddenly. Again, the burning voltage for the glow lamp 8 is supplied by the voltage across resistor 701 so that the glow lamp 8 ignites and glows steadily only after the full predetermined charge is reached on the storage capacitor 4.

What is claimed is:

1. Electronic flash apparatus having a storage capacitor chargeable through a direct-current converter and having a glow lamp arranged to light at a predetermined threshold voltage corresponding to a specific charge voltage of said storage capacitor, said glow lamp being arranged so that said predetermined threshold voltage approximately equals the burning voltage of said glow lamp, means for applying periodic ignition pulses to said glow lamp, said pulse applying means being arranged for deriving said ignition pulses from voltage pulses occurring during periodic switching of said converter, said converter being a transformer having a secondary winding connected through a rectifier with said storage capacitor, a resistance voltage divider connected in parallel with said storage capacitor, said glow lamp being connected with a divider tap of said resistance voltage divider, said flash apparatus further comprising a capacitive voltage divider arranged for detecting voltage variations occurring at said secondary winding of said transformer on periodic switching of said converter, and circuit means connecting a divider tap of said capacitive voltage divider with said glow lamp and with said divider tap of said resistance voltage divider.

2. The apparatus of claim 1, wherein said converter is arranged to operate as a blocking converter, said capacitive voltage divider is connected in parallel with said secondary winding, and said glow lamp is connected to a potential point of said resistance voltage divider having a potential lower than the potential of said divider tap of said resistance voltage divider.

3. The apparatus of claim 1, wherein said converter is arranged to operate as a through-flow converter, said capacitive voltage divider is connected in parallel with said secondary winding, and said glow lamp is connected to a potential point of said resistance voltage divider having a potential higher than the potential of said divider tap of said resistance voltage divider.

4. The apparatus of claim 1, wherein said rectifier is a two-way rectifier, and said capacitive voltage divider is connected between an input lead and an output lead of said rectifier.

* * * * *